May 8, 1956   L. E. BAUER   2,745,088
FISHING ROD HOLDER WITH SIGNAL MEANS
Filed April 16, 1954

Lawrence E. Bauer
INVENTOR.

BY *Lawrence A. O'Brien*
*and Harvey B. Jacobson*
Attorneys

United States Patent Office 2,745,088
Patented May 8, 1956

2,745,088

FISHING ROD HOLDER WITH SIGNAL MEANS

Lawrence E. Bauer, Mitchell, S. Dak., assignor of one-half to George L. Kiner, Mitchell, S. Dak.

Application April 16, 1954, Serial No. 423,599

4 Claims. (Cl. 340—213)

This invention relates to a rod holder, and more particularly to a device for supporting a fishing rod in operative position and which will flash a visible signal to indicate a bite on the line.

An object of this invention is to provide a rod holder having novel means for mounting the same in position on the bank of a body of water.

Another object of this invention is to provide a rod holder having novel means for resiliently maintaining the rod in an operative position.

A further object of this invention is to provide a rod holder having novel means thereon for producing a visible signal for indicating a bite on the line attached to the rod.

A yet further object of this invention is to provide a rod holder which can be used in conjunction with a boat or can have the rod removed therefrom and be used as a signal light or as a means of illumination for changing of tires, or the like.

A still further object of this invention is to provide a rod holder which is simple and efficient in construction, and durable and lasting in use.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
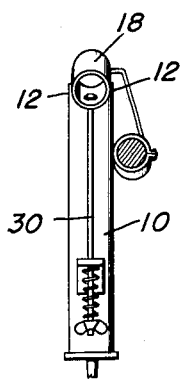
Figure 2 is a rear end elevational view of the rod holder forming the subject of this invention.
Figure 1:
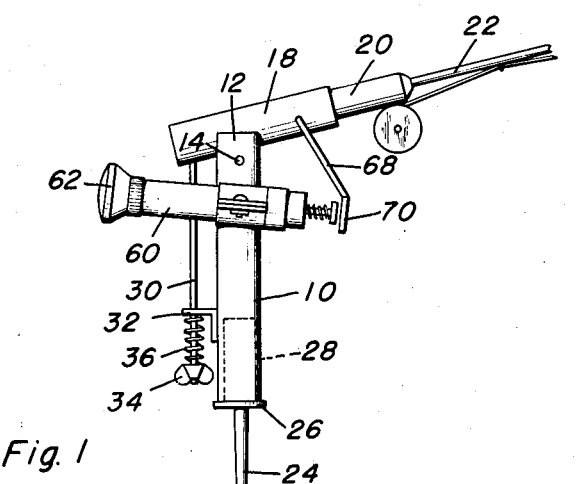
Figure 1 is a side elevational view of the rod holder forming the subject of this invention with a fishing rod mounted thereon.
Figure 4:
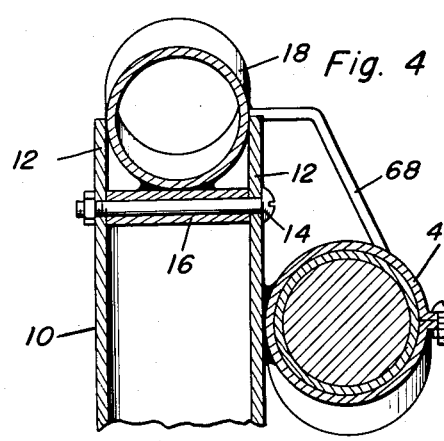
Figure 4 is a vertical sectional view taken through the rod holder forming the subject of this invention and looking toward the front of the rod holder.
Figure 3:
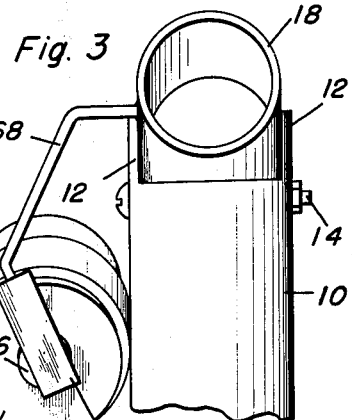
Figure 3 is an enlarged detailed view from the front of the upper end of the rod holder forming the subject of this invention.
Figure 5:
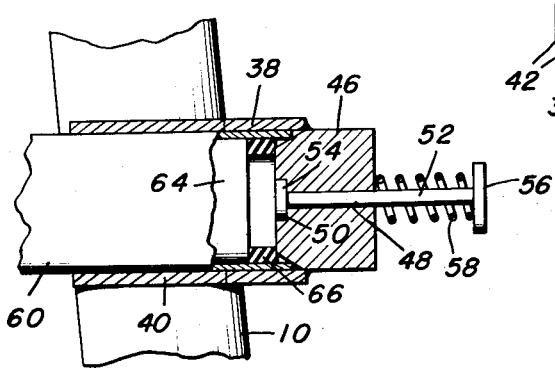
Figure 5 is a sectional view of the switch means for actuating the signal means.

Referring now more particularly to the acompanying drawings, it will be seen that the improved rod holder forming the subject of this invention includes, a vertical standard formed of a tubular member 10. The tubular member 10 is open at both ends and the upper end thereof is bifurcated to provide two upwardly extending arms 12. Extending between the arms 12 and transverse to the longitudinal axis of the tubular member 10 is a bolt 14 having a sleeve 16 rotatably mounted thereon and disposed between the arms 12. Fixedly secured to the sleeve 16 by means of welding or the like, is a tubular member 18. The member 18 has a major portion thereof extending from one side of the tubular member 10. A handle portion 20 of a fishing rod 22 is adapted to be placed within the tubular member 18 for supporting the fishing rod 22 in operative position.

A pin 24 having a lower pointed end and an upper enlarged head 26 is provided for attachment to the lower end of the tubular member 10. A projection 28 is secured to the upper face of the enlarged head 26 and is adapted to be received within the tubular member 10. Thus, it will be seen that the tubular member 10 is capable of movement about a vertical axis and the member 18 is capable of movement about a horizontal axis.

In order to maintain the fishing rod 22 at a desired angle a shaft 30 is fixedly secured to the rear end of tubular member 18 and extends substantially parallel to the tubular member 10. An angle shaped bracket having a horizontal portion 32 is secured to the member 10 and has an aperture slidably receiving the shaft 30. A wing nut 34 is threadedly engaged on the lower end of the shaft 30 below the horizontal portion 32 of the bracket and a coil spring 36 is disposed between the wing nut 34 and the horizontal portion 32. The spring 36 in acting between the bracket 32 and the wing nut 34 will maintain the tubular member 18 at the desired angular position.

In order that an indication will be given when a fish takes the line, there is provided a signal means on the member 10. This signal means includes a clamp fixedly secured by welding or the like to the member 10. The clamp is provided from a tubular member having a circular portion 38 and a split ring portion 40. The split ring portion 40 is provided with radially outwardly projecting ears 42 at the free ends thereof which are connected together by means of a fastener 44. Fixedly secured in the circular portion 38 is a plug 46 having a bore 48 extending therethrough in alignment with the longitudinal axis of the clamp. The inner end of the plug 46 is provided with a counterbore 50 in alignment with the bore 48. A rod 52 is provided with a head 54 which is adapted to be seated within the counterbore 50. The rod 52 extends from the end of the plug 46 and is provided with a head 56 forming an abutment for one end of a coil spring 58. The other end of the coil spring 58 is adapted to engage the base of the plug 46 for urging the plunger 54 into the counterbore 50.

A casing 60 is adapted to be received within the split-ring portion 40 of the clamp and frictionally retained therein by tightening the bolts 44. The casing 60 is provided with the conventional reflector head 62 having a bulb disposed therein. The inner end of the casing 60 is adapted to engage the plug 46. Suitable dry cell batteries 64 are disposed within the casing 60 and are maintained in engagement with the bulb in the reflector head by means of an insulated spacer member 66 which is positioned between the plug 46 and the end battery 64. By depressing the plunger 54 into engagement with the battery 64 the circuit for the bulb will be completed thereby illuminating the same.

Fixedly secured to the forward end of the tubular member 18 is an arm 68 having an enlarged bearing member 70 secured to the free end thereof. The arm 68 is so shaped that the bearing portion 70 will engage the head 56 of the plunger for depressing the same when the tubular member 18 is depressed downwardly.

In practical use of the device, the pin 24 is placed in position along the bank of a body of water and the tubular member 10 mounted thereon. Then, the handle portion 20 of a fishing rod 22 is placed in the tubular member 18 and the tension of spring 36 is adjusted. When a fish bites on the line and pulls, the member 18 will be depressed causing the plate 70 to engage the head 56 to depress the plunger and complete the circuit for the bulb in the reflector head 62. This will provide a visual signal whereby the fisherman will know that there is a bite on his line. The pin 24 can also be mounted in an oarlock of a boat when fishing from a boat. Further, the holder can be used without the rod at night for positioning the light to illuminate a portion of a vehicle when changing a tire or making other repairs.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A rod holder comprising a vertical standard rod supporting means pivotally secured to the top of said standard for movement about a horizontal axis, resilient means mounted on said standard and connected to said rod supporting means for maintaining the same in adjusted position, signal means carried by said standard in fixed position adjacent the top thereof, means mounted on said rod supporting means and engageable with said signal means for actuating the same, said vertical standard being provided with a bifurcated upper end, said rod supporting means comprising a tubular member pivotally secured adjacent one end to the bifurcated end of said standard, said resilient means including a rod fixedly secured to said one end of the tubular member and extending parallel to said standard, a bracket on said standard slidably receiving said rod, an abutment adjustably mounted on said rod adjacent the free end thereof, and a spring disposed on said rod between said abutment and said bracket for resiliently urging said rod in one direction.

2. A rod holder comprising a vertical standard rod supporting means pivotally secured to the top of said standard for movement about a horizontal axis, resilient means mounted on said standard and connected to said rod supporting means for maintaining the same in adjusted position, signal means carried by said standard in fixed position adjacent the top thereof, and means mounted on said rod supporting means and engageable with said signal means for actuating the same, said vertical standard being provided with a bifurcated upper end, said rod supporting means comprising a tubular member pivotally secured adjacent one end to the bifurcated end of said standard, said signal means including a clamp fixedly secured to said vertical standard adjacent the top thereof, a flashlight casing adapted to be received in said clamp, said casing having a bulb mounted in one end and at least one battery disposed therein, the other end of said casing being open and a switch fixedly mounted on said clamp and closing the said other end of said casing.

3. The combination of claim 2 wherein said signal actuating means comprises an arm secured adjacent one end of said tubular member and adapted to engage said switch for actuating said signal means when the tubular member is moved from its preselected position.

4. A holder for a fishing rod comprising a standard having means at one end, its lower end, for example, adapted to fasten the standard in a substantially vertical usable position, a clamp fixed to said standard below the upper end portion of the standard, a flashlight mounted in said clamp, a switch embodying a plug, a spring-pressed plunger slidably and operably mounted in said plug and provided with a head, said upper end being bifurcated and providing a pair of complemental furcations, a tubular member pivotally mounted intermediate its ends between the respective furcations and providing a socket which is adapted to receive an insertable and removable fishing rod, an arm fixedly secured to an intermediate portion of said socket member and having a bearing member at one end movable toward and from and cooperable with said plunger head.

References Cited in the file of this patent

UNITED STATES PATENTS 2,481,881    Schneider _____ Sept. 13, 1949